United States Patent [19]

Wake et al.

[11] Patent Number: 4,673,774

[45] Date of Patent: Jun. 16, 1987

[54] SUPERCONDUCTOR

[75] Inventors: Masayoshi Wake, Uehara; Osamu Taguchi; Mitsuyuki Imaizumi, both of Amagasaki, all of Japan

[73] Assignee: Mitsubishi Denki Kabushiki Kaisha, Tokyo, Japan

[21] Appl. No.: 795,108

[22] Filed: Nov. 5, 1985

[30] Foreign Application Priority Data

Nov. 6, 1984 [JP] Japan ................................ 59-233442

[51] Int. Cl.$^4$ ......................... H02G 15/08; H01R 4/00

[52] U.S. Cl. .................................... 174/94 R; 29/599; 29/868; 29/869; 174/126 S; 174/128 S

[58] Field of Search .............. 174/94 R, 126 S, 128 S; 29/599, 868, 869

[56] References Cited

U.S. PATENT DOCUMENTS 3,837,066 9/1974 Mori et al. .................. 174/126 S X
3,895,432 7/1975 Diepers et al. ............... 174/94 R X

FOREIGN PATENT DOCUMENTS 1964458 8/1970 Fed. Rep. of Germany ... 174/126 S
55-28399 7/1980 Japan .
57-185605 11/1982 Japan .

OTHER PUBLICATIONS

Hirabayashi et al., "Cooling and Excitation Tests of a Thin lmϕ×lm Superconducting Solenoid Magnet", *Japanese Journal of Applied Physics,* 21, (8), pp. 1149–1154, 1982.

Fukutsuka et al. "Aluminum Cladded Superconductor for Particle Detector", *Kobe Steel Engineering Reports* 34 (3), pp. 39–42.

*Primary Examiner*—Morris H. Nimmo
*Attorney, Agent, or Firm*—Leydig, Voit & Mayer

[57] ABSTRACT

A superconductor comprises two superconducting wires butt-jointed, a superconducting doubling wire electrically and mechanically connecting the superconducting wires, and a stabilizer attached to the superconductors and the doubling wire to extend therealong, the superconductors, the doubling wire and the stabilizer together forming a superconductor of a constant cross-sectional area. A manufacturing process is also disclosed.

2 Claims, 13 Drawing Figures

SUPERCONDUCTOR

BACKGROUND OF THE INVENTION

This invention relates to a superconductor and more particularly to a joint between two superconducting wires in a stabilized superconductor.

A typical superconductor is formed by embedding a superconducting wire capable of establishing a superconducting state at a cryogenic temperature within a stabilizer material for thermally and electrically stabilizing an established superconducting state. The materials used for the superconducting wire include an alloy material such as NbTi and NbTiTa as well as a compound material such as $Nb_3Sn$ and $V_3Ga$. The most typical conductor comprises a superconducting wire formed of a number of NbTi filaments having a diameter of less than 50 microns and a stabilizer formed of a copper matrix.

The method of manufacturing the above-described superconductor will now be explained taking a Cu/NbTi superconductor (copper cladded NbTi superconductor) as an example. First, a number of copper-cladded NbTi bars are inserted into a copper tube having a typical diameter of from 100 mm to 250 mm. This assembly is used as a composite billet to be extruded into a composite rod having a diameter of from 30 mm to 80 mm which is then subjected to swaging, drawing or rolling for reducing the cross-sectional area and, after twisting, finished into the desired predetermined dimensions. This process is applied not only to superconductors including Cu/NbTi superconducting wires but also to other superconductors. The length of the superconductor is limited due to the limited volume of the composite billet used to from the superconducting wires.

On the other hand, as a stabilizer used for the purpose of thermal and electrical stabilization, copper or aluminum is used in a composite state with the superconducting wire. Recently, as superconducting solenoid magnets are put into practical use, superconductors are required to carry higher-density current and to be more compact and reduced in weight. Superconducting magnets for use in elementary particle detectors are further required to have high permeability with respect to elementary particles. Aluminum, particularly high purity aluminum, has superior electrical and thermal conductivity at cryogenic temperatures and, moreover, has good permeability and small specific weight. Aluminum further exhibits saturation characteristics in magnetic reluctance, providing a number of advantages against copper as a stabilizer material.

However, it is very difficult to make a superconductor having a stabilizer of aluminum, because the mechanical properties of high-purity aluminum are very different when compared to the superconductor material. For this reason, it is very difficult to make a composite material with these materials, and the high-purity aluminum stabilizer is generally combined after the copper cladded NbTi superconducting wire has been manufactured.

One example of a cross section of a superconductor thus manufactured is illustrated in FIG. 1, in which a conventional superconductor comprises a Cu/NbTi superconducting wire 1 which is a copper-cladded NbTi wire, and a stabilizer 2 of high-purity aluminum surrounding the superconducting wire 1. The Cu/NbTi superconducting wire 1 is embedded within the aluminum stabilizer 2. and they are metallurgically joined so that good electrical and thermal conduction is established therebetween. When a large superconducting solenoid magnet is to be manufactured, the superconductor to be wound must be long, and while the high-purity aluminum stabilizer 2 can be made as long as desired since the high-purity aluminum stabilizer 2 can be connected by hot extrusion, the length of the Cu/NbTi superconducting wire 1 of Cu/NbTi is limited. However, it is impossible to connect the superconducting wires 1 without any harm to the current characteristics. Therefore, the superconducting wires 1 has to be connected with predetermined lengths of the superconductors overlapping each other and with the high purity aluminum stabilizers 2 welded to each other. This process is disclosed in an article entitled "Cooling and Excitation Tests of a Thin 1 m×1 m "Superconducting Solenoid Magnet" by H. Hirabayashi et al, Japanese Journal of Applied Physics, Vol. 21, No. 8, August, 1982, pp. 1149–1154. A cross section of the joint of a superconductor thus manufactured is as shown in FIG. 2, in which two sections of the high-purity aluminum stabilizer 2 are welded together by a weld 2*a*.

In the above superconductor, since the shape of the superconductor is different from other portions at the joint and has a thickness twice as thick as the other portion, gap regions or portions from which the superconductor is absent are formed between the turns of a superconducting magnet an indirect cooling structure. This causes problems in that the depleted region is mechanically unstable and destroys the uniformity of the magnetic field.

SUMMARY OF THE INVENTION

Accordingly, an object of the present invention is to provide a superconductor which is mechanically and thermally stable and does not affect the superconducting properties of the superconductor.

Another object of the present invention is to provide a superconductor which is free from the superconducting wire gap region even when the superconductor is wound into a coil or the like.

With the above objects in view, a superconductor according to the present invention comprises two superconducting wires axially aligned and butt-jointed, a superconducting doubling wire extending along and electrically connecting the superconducting wires, and a stabilizer attached to the superconductors and the doubling wire to extend therealong, the superconductors, the doubling wire and the stabilizer together forming a superconductor of a constant cross-sectional area.

With the above arrangement, the thickness of the superconductor is constant at any position, so that no problem of gap region arises when the superconductor is wound into a solenoid magnet for example and the superconductor is mechanically and electrically stable.

BRIEF DESCRIPTION OF THE DRAWINGS

The invention will become more readily apparent from the following detailed description of the preferred embodiment taken in conjunction with the accompanying drawings, in which.

PREFERRED EMBODIMENTS OF THE INVENTION

Figure 4:
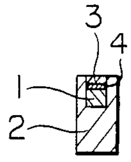
FIG. 4 is a cross-sectional view taken along the line IV—IV of FIG. 3.
Figure 3:
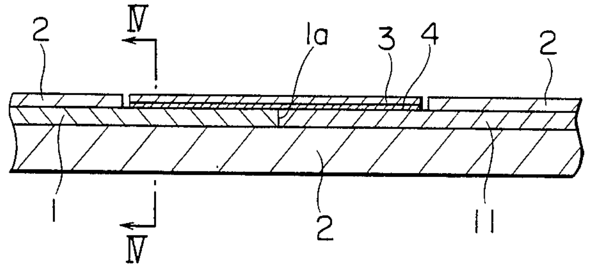
FIG. 3 is a cross-sectional side view of a superconductor section illustrating a superconducting joint of the present invention.

FIGS. 3 and 4 illustrate a superconductor constructed in accordance with the present invention, and FIGS. 5 to 9 illustrate how the superconductor shown in FIGS. 3 and 4 is manufactured. In these figures, a superconductor comprises a first superconducting wire 1 and a second superconducting wire 11 connected at their adjacent ends by butt welding for example to form a joint 1*a*. The connected superconducting wires 1 and 11 which may be Cu/NbTi alloy (copper cladded NbTi alloy) are embedded within a stabilizer 2 of such as high-purity aluminum. The stabilizer 2 may be formed by extruding aluminum stabilizer material around the superconducting wires 1 and 11. From FIGS. 3 and 4, it is seen that the portion of the stabilizer 2 corresponding to the top surface of the superconducting wires 1 and 11 is removed to form a groove exposing the top surfaces of the superconducting wires 1 and 11 over a predetermined length, and that a superconducting doubling wire 3 is placed on and bonded to the exposed top surfaces of the superconducting wires 1 and 11 by means of a solder layer 4. Thus, the superconducting doubling wire 3 extends along the two superconducting wires 1 and 11 bridging between two jointed wires 1 and 11 to provide an electrically and mechanically stable joint. It is also seen that the dimensions of the superconducting doubling wire is selected so that the outer dimension of the superconductor thus connected is constant at any position along the length of the conductor.

Figure 5:
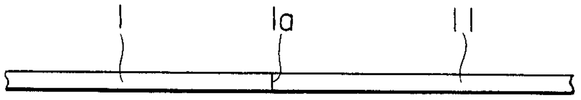
FIG. 5 is a side view showing the superconducting wires butt-jointed.
Figure 7:
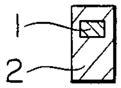
FIG. 7 is a sectional view taken along the line VII—VII of FIG. 6.
Figure 6:
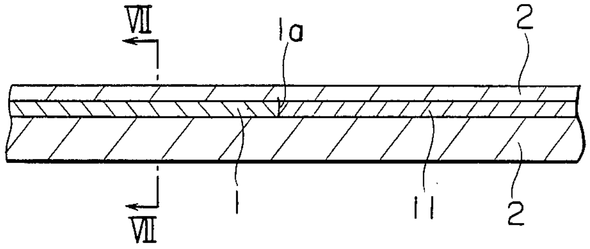
FIG. 6 is a cross-sectional side view showing the superconducting wires embedded within the stabilizer.
Figure 9:
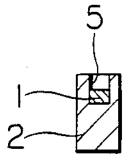
FIG. 9 is a sectional view taken along the line IX—IX of FIG. 8.
Figure 8:
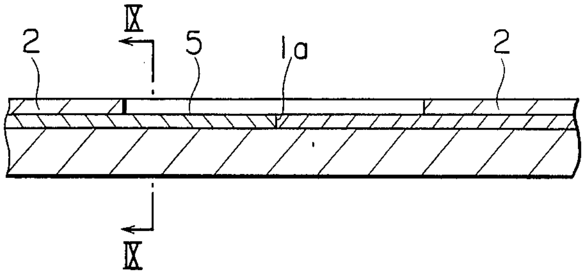
FIG. 8 is a sectional side view illustrating the superconductor joint just before completion.

FIGS. 5 to 9 show a process for manufacturing the superconductor shown in FIGS. 3 and 4. In FIG. 5, the first and the second superconducting wires 1 and 11 are jointed by butt welding for example at their adjacent ends to form a joint 1*a* therebetween. The superconducting wires 1 and 11 thus joined are then surrounded by the aluminum stabilizer 2 as shown in FIGS. 6 and 7. In the illustrated embodiment, the stabilizer 2 has a rectangular cross section, and the thickness of the stabilizer portion laying on the top surface of the embedded superconducting wires 1 and 11 is equal to the thickness of the superconducting wires 1 and 11. Such configuration can be made by extrusion of high-purity aluminum around the joined superconducting wires 1 and 11. Then, a portion of the aluminum stabilizer 2 on the top surfaces of the superconducting wires 2 and 11 in the area about the joint 1*a* between the wires 1 and 11 is removed as shown in FIGS. 8 and 9 by machining to provide an elongated groove 5 on the top surface of the superconductor. In the bottom of the groove 5, the top surfaces of the superconducting wires 1 and 11 as well as the joint 1*a* are exposed. The length of the groove 5 may preferably be 1.5 meters. The elongated groove 5 is then filled by the superconducting doubling wire 3 and the doubling wire 3 is securely bonded to the conductor by a layer of solder 4 of a Pb-Sn alloy for example. Thus, the doubling wire 3 extends along and in electrical contact with the first and second superconducting wires 1 and 11 to bridge the butt joint 1*a*, thereby establishing a superior electrical and mechanical connection between the superconducting wires 1 and 11.

Since the superconductor of the present invention is constructed as described above, the cross-sectional dimension of the conductor is identical at any position along its length, and the superconducting doubling wire bridges between two superconducting wires. Therefore, the gap region of the superconductor between the coil turns does not occur when the superconductor is wound into a solenoid coil and so that small fluctuations in the magnetic field do not appear. Also, when the superconductor of the present invention is used to manufacture a superconducting magnet of the indirect cooling type, the magnet becomes mechanically very strong. Also, since there are no bulges in the superconductor in the vicinity of the joint between the superconducting wires as there is in the conventional design, and since the superconducting doubling wire overlaps and is secured to two superconducting wires, the tensile strength of the superconductor at the wire joint in the longitudinal direction is not less than that of other portions of the superconductor, so that a reliable and stable superconducting magnet can be manufactured. Further, since the length of the superconducting doubling wire 3 can be sufficiently long, electrical resistance of the joint when immersed in liquid helium can be made as small as 0.8 nano-Ohms.

While in the embodiment described above the superconducting doubling wire 3 is soldered to the first and the second superconducting wire 1 and 11 with a Pb-Sn alloy solder which is generally reliable, another brazing material exhibiting good bonding and electrical conducting properties may equally be used in the present invention. Also, while the superconducting doubling wire 3 is bonded only to the first and the second superconducting wires 1 and 11 which are direct current paths in the above embodiment, the doubling wire 3 may be additionally bonded or joined to the inner surface of the elongated groove 5 formed in the high-purity aluminum stabilizer 2, thereby further increasing the mechanical strength and the thermal conductivity of the joint between the superconducting wires. The length of the superconducting doubling wire 3 may be suitably selected. For example, when the length of the doubling wire 3 is 1.5 meters, the electrical resistance across the joint is 0.8 nano-Ohms, but the resistance may be further decreased to a very low value with a longer doubling wire.

Figure 1:
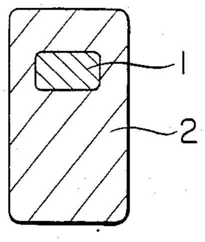
FIG. 1 PRIOR ART
FIG. 1 is a cross-sectional view of a conventional superconductor.
Figure 2:
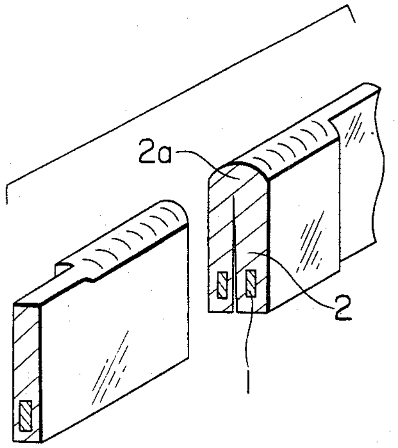
FIG. 2 PRIOR ART
FIG. 2 is a perspective view illustrating a conventional superconductor joint partly broken away.
Figure 10:
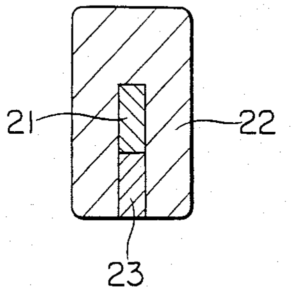
FIGS. 10 to 13 are cross-sectional views illustrating modified configurations of the superconductor joint according to the present invention.
Figure 11:
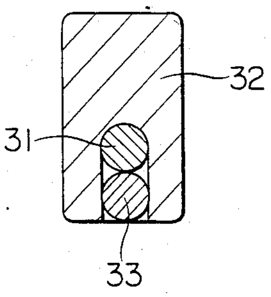
Figure 12:
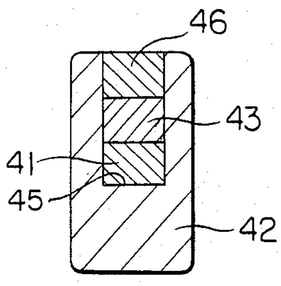
Figure 13:
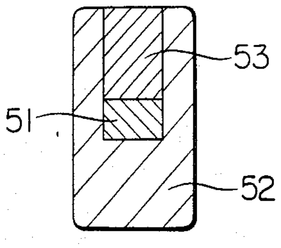

FIGS. 10 and 13 illustrate other embodiments of the superconductor of the present invention in which various cross-sectional configurations of the superconductor joint are shown. In FIG. 10, it is seen that the superconducting wire 21 is positioned with its width in parallel with the width of the stabilizer 22 and, therefore, the superconducting doubling wire 23 is similarly arranged with its width in parallel with the width of the stabilizer 22. In FIG. 11, a superconductor joint comprises a superconducting wire 31 and a superconducting doubling wire 33 both having a circular cross section. FIG. 12 illustrates a superconductor which has a superconducting wire 41 embedded generally in the center of the superconductor. The superconducting wire 41 is placed on the bottom of a deep groove 45, and a superconducting doubling wire 43 having substantially the same cross-sectional shape is bonded to the superconducting wire 41 and the top surface of the doubling wire 43 is covered by additional high-purity aluminum stabilizer material 46 so that the outer surface of the stabilizer material 46 is flush with the outer surface of the extruded stabilizer 42. In FIG. 13, the superconducting doubling wire 53 has an increased thickness as compared to that shown in FIG. 12 and the outer surface of the doubling wire 53 defines the continuous contour of the superconductor.

Although the above embodiments have been described in conjunction with the Cu/NbTi superconducting wire, the present invention is equally applicable to superconducting wires made of $Nb_3Sn$ or $V_3Ga$. Similarly, the stabilizer may be made of copper or other suitable metals having superior thermal and electrical conductivity. Also a mechanical reinforcing member such as one made of stainless steel bar may be attached along the superconducting wire or the superconducting doubling wire.

As has been described, in the superconductor joint according to the present invention, the thickness of the superconductor is constant at any position, so that no problem of depletion of the superconducting wire arises when the superconductor is wound into a solenoid magnet for example and the superconductor is mechanically and electrically stable.

What is claimed is:

1. A superconductor joint comprising two superconducting wires axially aligned and butt-jointed, a superconducting doubling wire extending along and electrically connecting the superconducting wires, and a stabilizer attached to said superconductors and said doubling wire to extend therealong, said superconductors, said doubling wire and said stabilizer together forming a superconductor of a constant cross-sectional area.

2. A method for manufacturing a superconductor joint comprising the steps of:

butt joining adjacent ends of superconducting wires;

surrounding the butt-jointed superconducting wires with extruded stabilizer material;

removing a portion of said stabilizer material to expose the butt-jointed end regions of said superconducting wires; and bonding a superconducting doubling wire to the exposed surface of said superconducting wires to electrically and mechanically connect said two superconducting wires across said butt-joint.

* * * * *